Aug. 31, 1937.  K. WAACK  2,091,461
SCRAPER FOR BOILER AND CONDENSER TUBES
Filed July 13, 1936
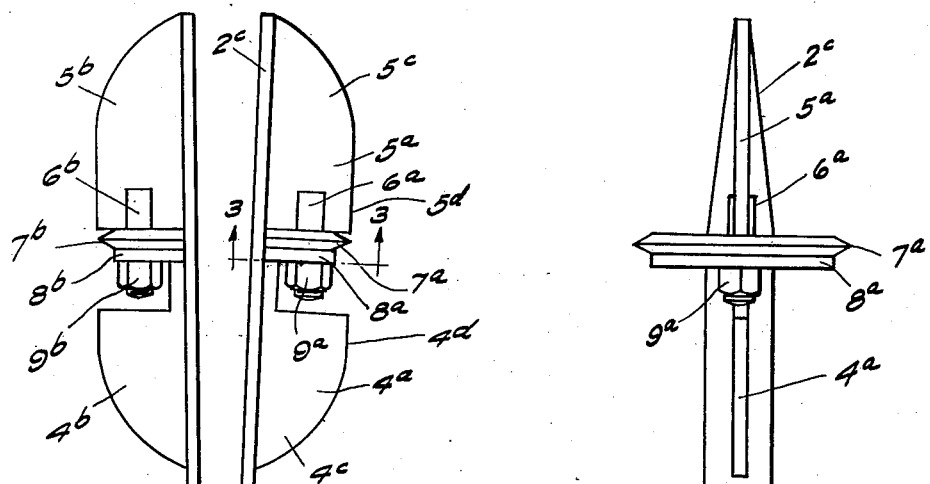
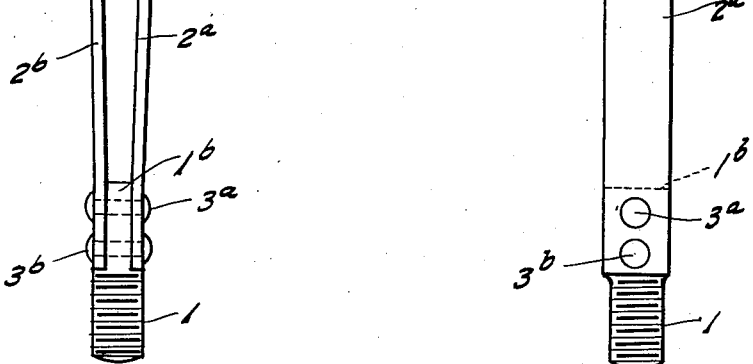
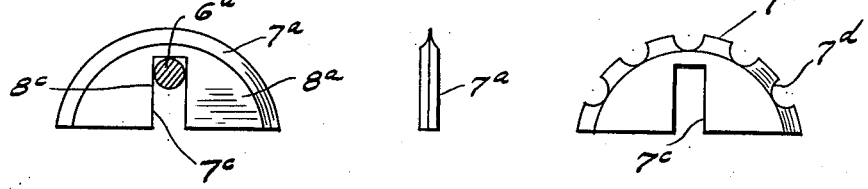
INVENTOR
KARL WAACK
BY
J. S. Sparkes
ATTORNEY Patented Aug. 31, 1937

2,091,461

UNITED STATES PATENT OFFICE 2,091,461

SCRAPER FOR BOILER AND CONDENSER TUBES

Karl Waack, New York, N. Y.

Application July 13, 1936, Serial No. 90,351

1 Claim. (Cl. 15—104.18)

This invention relates to improvements in boiler and condenser tube scrapers, and has as its principal object to provide a simple workable tool which can take care of the general run of tube cleaning to be done on board ship or in other power plants.

This scraper has very few parts, most of which are welded together to give maximum strength and durability. The work of scraping scale from boiler tubes is very severe on the cutters and this tool has been designed so that the cutters may be easily replaced. Furthermore at times when heavy deposits of scale are in the tubes it is desirable to have a special blade notched in its periphery to form teeth which reduces the working surface, increases clearance for the scale and breaks up the scale into smaller parts which may be pushed from the tube with the full edge cutters.

A ship is limited as to the number of tools it can carry and it is a vital feature to have a single universal tool in which the cutters are replaceable.

There are several vital details to have the tool work properly and these will be readily understood by reference to the accompanying drawing, in which, Fig. 1 is a front elevation of the scraper head showing the spring prongs distended as when out of the boiler tube.

Fig. 2 is a side elevation of the scraper head taken at right angles to Fig. 1.

Fig. 3 is a section on the line 3—3 of Fig. 1.

Fig. 4 is an edge view of the cutter showing the undercutting of the scraper blade.

Fig. 5 is a front view of one half of a set of blades, provided with notches to form teeth for easy breaking up of heavy scale.

Similar reference numerals refer to similar parts throughout the drawing.

1 is a threaded stud adapted to screw into a long handle or pipe (not shown) which is flattened on one end 1b; flat spring steel spring members 2a and 2b are securely riveted thereto with rivets 3a and 3b. The flat springs extend divergently from the stud and terminate in pointed ends 2c.

The divergence of the flat springs and their spring strength determine the amount of pressure applied on the cutter blades when the head is pushed thru the tube.

At right angles to the flat sides of the springs and paraxial thereto are welded guide vanes 4a, 4b, and 5a, 5b. These vanes have straight edges 4d and 5d which are parallel to and guide the head thru the tube. Mounted on the rear of the vanes 5a and 5b are studs 6a and 6b which are preferably made of square stock, slit and welded thereto. The projecting ends of these studs are threaded and receive the nuts 9a and 9b. On the projecting square sections of these studs are mounted scraper blades 7a and 7b. These blades are substantially segments of a circle and have slots 7c which permit them to slide into position on the square studs and against the ends of the guiding vanes 5a and 5b. To securely back up the blades washers 8a and 8b having square holes 8c therein are slipped over the stud ends and clamped in place by the nuts 9a and 9b.

The scraping edge of the blade 7a is preferably undercut slightly on both sides as shown in Fig. 4. This gives a very fine finish when used as a final pass.

For breaking up heavily formed scale a cutter with its edge notched to form teeth 7d as in Fig. 5 is preferable.

The long straight edges 4d and 5d of the guide vanes are very essential to keep the cutters exactly at right angles to the walls of the tube to be cleaned, as the tubes are often long and to reach thru them requires a long heavy handle, and the very weight of the handle alone will tend to cause the entire head to tilt and bind in the tube.

In using the scraper a set of blades is selected either as in Fig. 5 for rough heavy scale or as in Figs. 3 and 4 for light thin scale, and when bolted into the scraper head the ends 5c and 5b are squeezed together and pushed into the boiler tube, then the scraper is pushed thru several times, twisting around a little on each stroke.

This application forms a continuance in part of application Serial No. 45,421, filed October 17, 1935.

Having described my invention what is claimed as new and is desired to be secured by Letters Patent, is:

In a tube scraper, a shaft, forwardly extending divergent spring arms attached thereto, longitudinal guide runners with long tube wall contacting straight edges rigidly mounted on the said arms, a transverse single edge scraping blade mounted in an outwardly opening recess formed intermediate the ends of each runner, and means to clamp the blades in fixed position, the said tube wall contacting straight edges serving at all times to maintain the scraping blades substantially at right angles to the tube walls.

KARL WAACK.